(12) United States Patent
Nesori et al.

(10) Patent No.: US 7,616,407 B2
(45) Date of Patent: Nov. 10, 2009

(54) DISK DRIVE APPARATUS

(75) Inventors: Hirofumi Nesori, Ome (JP); Takeshi Okutomi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/242,514

(22) Filed: Sep. 30, 2008

(65) Prior Publication Data

US 2009/0168250 A1   Jul. 2, 2009

(30) Foreign Application Priority Data

Dec. 27, 2007   (JP) ............................. 2007-338309

(51) Int. Cl.
    *G11B 21/22*   (2006.01)
(52) U.S. Cl. .................. 360/256.2; 360/256.4
(58) Field of Classification Search ....... 360/256–256.6
    See application file for complete search history.

(56) References Cited

U.S. PATENT DOCUMENTS

| 5,734,527 | A  | * | 3/1998  | Reinhart | .................. | 360/256.2 |
| 7,248,440 | B2 |   | 7/2007  | Kim et al. | | |
| 2005/0152069 | A1 | * | 7/2005 | Jeong | ...................... | 360/256.2 |
| 2005/0174697 | A1 | * | 8/2005 | Kim et al. | ................. | 360/256.2 |
| 2005/0219760 | A1 |   | 10/2005 | Hosono et al. | | |
| 2005/0264941 | A1 | * | 12/2005 | Tsuda et al. | .............. | 360/256.2 |
| 2006/0039086 | A1 |   | 2/2006 | Byun et al. | | |
| 2007/0019332 | A1 |   | 1/2007 | Kim et al. | | |
| 2008/0180852 | A1 | * | 7/2008 | Kim et al. | ................. | 360/256.2 |
| 2008/0192385 | A1 | * | 8/2008 | Choi et al. | ................ | 360/256.2 |
| 2008/0192386 | A1 | * | 8/2008 | Hwang et al. | ............. | 360/256.2 |

FOREIGN PATENT DOCUMENTS

JP        2005-235375        9/2005

* cited by examiner

*Primary Examiner*—William J Klimowicz
(74) *Attorney, Agent, or Firm*—Blakely, Sokoloff, Taylor & Zafman LLP

(57) ABSTRACT

According to one embodiment, a disk drive apparatus includes a base, a recording medium, a drive motor, a head, a carriage, and a latch mechanism. The latch mechanism includes a latch member, which is supported on the base to be movable between a latch position and a release position, and a latch stop provided on the base and configured to regulate the movement of the latch member in a direction of the latch position. The latch member has a first abutment portion which abuts the carriage and moves the latch member from the release position to the latch position according to the movement of the carriage, when the carriage moves from the information processing position to the retracted position, a latch hook capable of latching the carriage at the latch position, and a second abutment portion which confronts to the latch hook with a gap at the latch position.

7 Claims, 4 Drawing Sheets

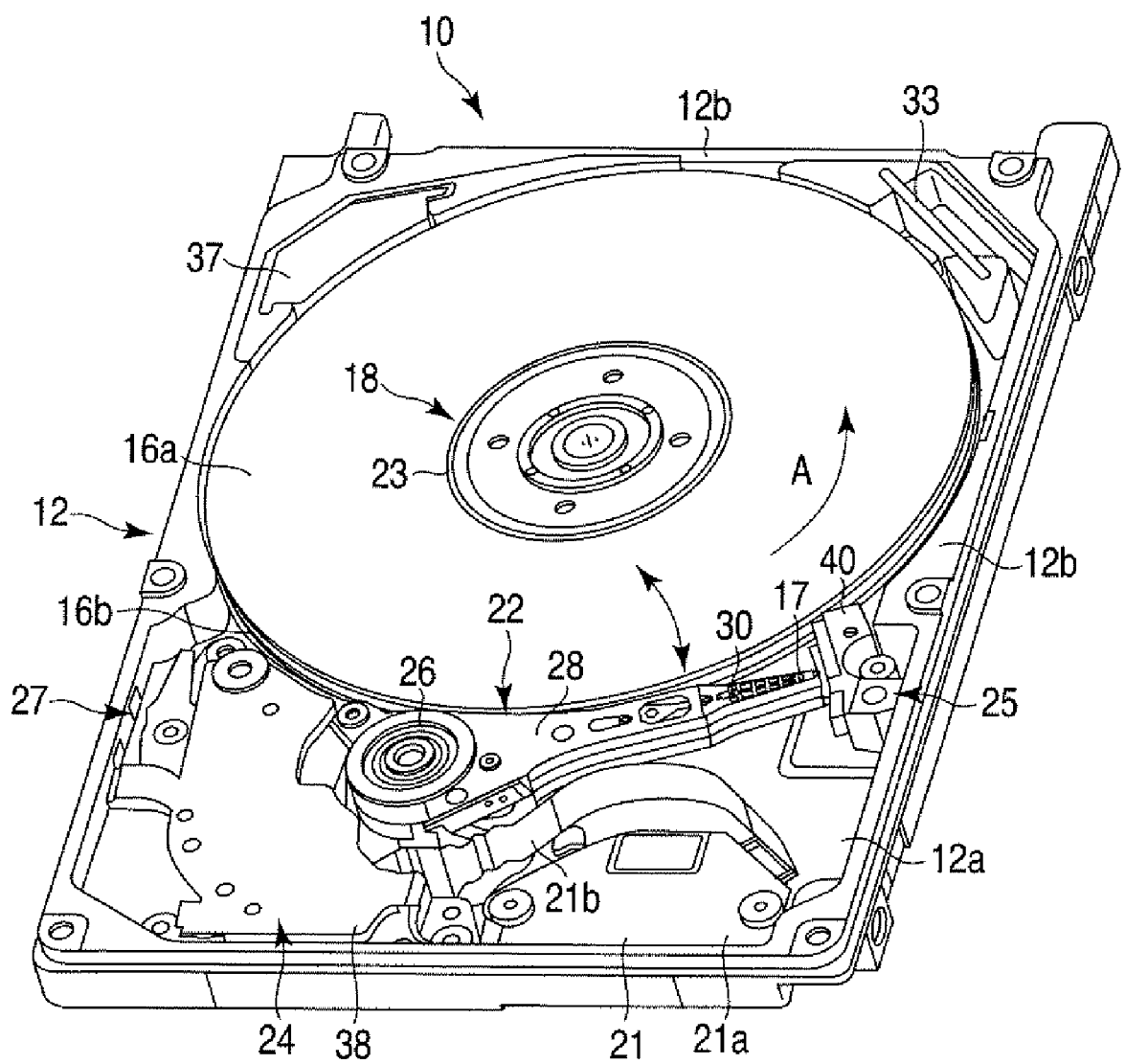
F I G. 1

DISK DRIVE APPARATUS

CROSS-REFERENCE TO RELATED APPLICATIONS

This application is based upon and claims the benefit of priority from Japanese Patent Application No. 2007-338309, filed Dec. 27, 2007, the entire contents of which are incorporated herein by reference.

BACKGROUND

1. Field

One embodiment of the present invention relates to a disk drive apparatus having a latch mechanism of a carriage.

2. Description of the Related Art

Recently, magnetic disk apparatuses, for example, are widely used as a large capacity disk apparatus in electronic appliances such as a personal computer and the like. In general, the magnetic disk apparatus has a magnetic disk, a spindle motor for supporting and driving the magnetic disk, a rotatable carriage for supporting a magnetic head, a voice coil motor (VCM) for driving the carriage, a board unit and the like, which are arranged in a case. The VCM includes a voice coil mounted on the carriage and a pair of yokes and a permanent magnet which are attached to a case side.

Further, recently, mobile compact personal computers are becoming widespread, and a magnetic disk apparatus mounted on this type of a personal computer is required to improve resistance to a shock and the like generated when it is carried.

To satisfy the requirement, there is proposed a magnetic disk apparatus provided with a ramp load mechanism for holding a magnetic head at a predetermined position when the magnetic disk apparatus is out of operation. The ramp load mechanism has a ramp arranged outside of a magnetic disk, and when the magnetic disk apparatus is out of operation, a carriage is rotated to a retracted position located to the outer peripheral edge of the magnetic disk, and a suspension rides on the ramp. With this operation, since the magnetic head is held at a position separated from the surface of the magnetic disk.

Further, Jpn. Pat. Appln. KOKAI Publication No. 2005-235375, for example, discloses a magnetic disk apparatus provided with a latch mechanism for more improving resistance to shock as this type of a magnetic disk apparatus. When a shock is applied to the magnetic disk apparatus when it is out of operation, the latch mechanism engages with a carriage and regulates that the carriage is rotated and holds the carriage at a retracted position.

The latch mechanism has a latch member including a latch hook and is disposed so as to move between a latch position at which it can be engaged with the carriage and a release position at which the latch mechanism can be released. When the carriage moves to the retracted position, the carriage abuts the abutting portion of the latch member and moves the latch member from the release position to a latch position. Then, the latch member abuts a stop and is held at the latch position. At the same time, the carriage is held at a retracted position using the latch member as the stop. With this operation, when a shock acts on the magnetic disk apparatus, the latch member latches the carriage and regulates its pivotal movement to thereby prevent the carriage from being unintentionally moved.

In the latch mechanism arranged as described above, when the magnetic disk apparatus is not operated, the carriage comes into contact with the latch member and uses the latch member itself as the stop. Accordingly, when a strong rotational shock acts on the magnetic disk apparatus to pivot the carriage in an unload direction, that is, in the direction of the retracted position direction, a large external force acts on the latch member through the carriage to thereby elastically deform the latch member greatly. Therefore, the latch member stores distortion energy which may push out the carriage in a disk direction.

When the magnetic disk apparatus receives the strong rotational shock, the amount of push-out of the carriage (amount of rebound) is increased, and since a latch hook of the latch member cannot engage with the carriage, the magnetic head is forcibly moved on the disk. As a result, it is considered that magnetic disk apparatus may be damaged. To reduce the rebound of the carriage and the distortion energy of the latch member, it is necessary to employ countermeasures of forming the latch member of a plurality of materials. Accordingly, design is made complex and manufacturing cost is increased.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is an exemplary perspective view showing an HDD according to an embodiment of the present invention;

DETAILED DESCRIPTION

Figure 2:
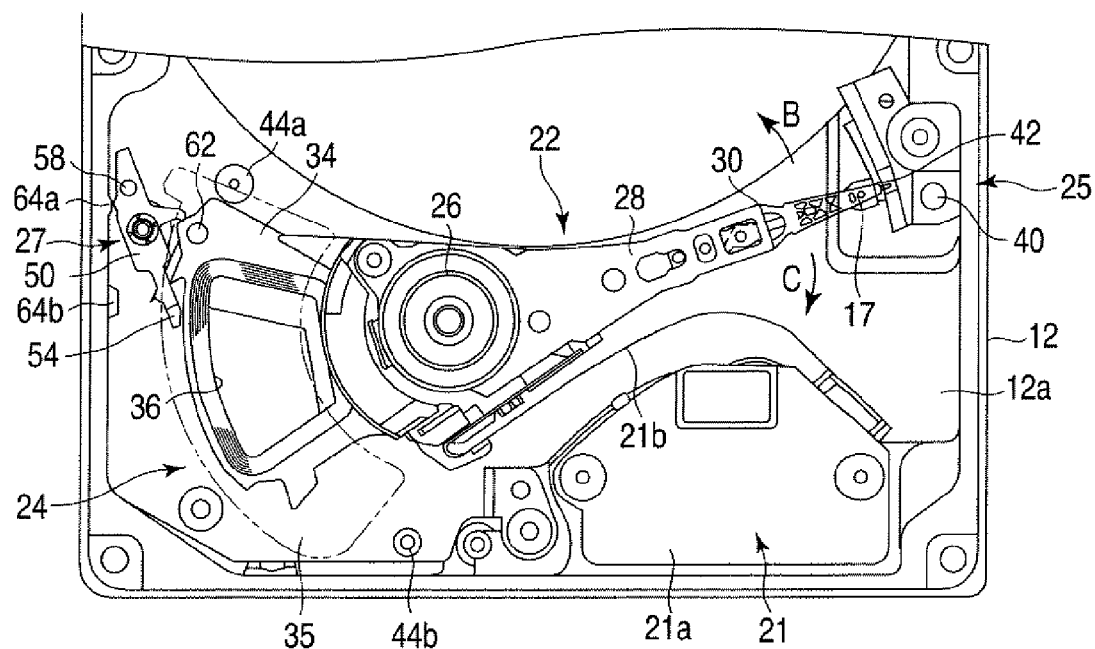
FIG. 2 is an exemplary view showing a part of the HOD in enlargement.

Various embodiments according to the invention will be described hereinafter with reference to the accompanying drawings. In general, according to one embodiment of the invention, a disk drive apparatus comprises: a base; a disk-shaped recording medium arranged on the base; a drive motor provided on the base which supports and rotates the recording medium; a head configured to perform information processing to the recording medium; a carriage which is provided on the base and supports the head to be movable with respect to the recording medium, the carriage being movable between a predetermined retracted position wherein the head is located on an outer periphery side of the recording medium and an information processing position wherein the head is located on the recording medium; a fixing stop which is provided on the base and abuts the carriage when the carriage moves to the retracted position and positions the carriage at the retracted position; and a latch mechanism configured to latch the carriage and hold it at the retracted position when the carriage receives an external force in state that the carriage moves to the retracted position. The latch mechanism includes a latch member, which is supported on the base to be movable between a latch position wherein the latch member is capable of latching the carriage and a release position wherein the latch member releases the latch, and a latch stop provided on the base and configured to regulate the movement of the latch member in a direction of the latch position. The latch member has a first abutment portion which abuts the carriage and moves the latch member from the release position to the latch position according to the movement of the carriage, when the carriage moves from the information processing position to the retracted position, a latch hook capable of latching the carriage at the latch position, and a second abutment portion which confronts to the latch hook with a gap at the latch position.

A hard disk drive (HDD) according to an embodiment of the present invention will be explained in detail referring to the drawings.

Figure 3:
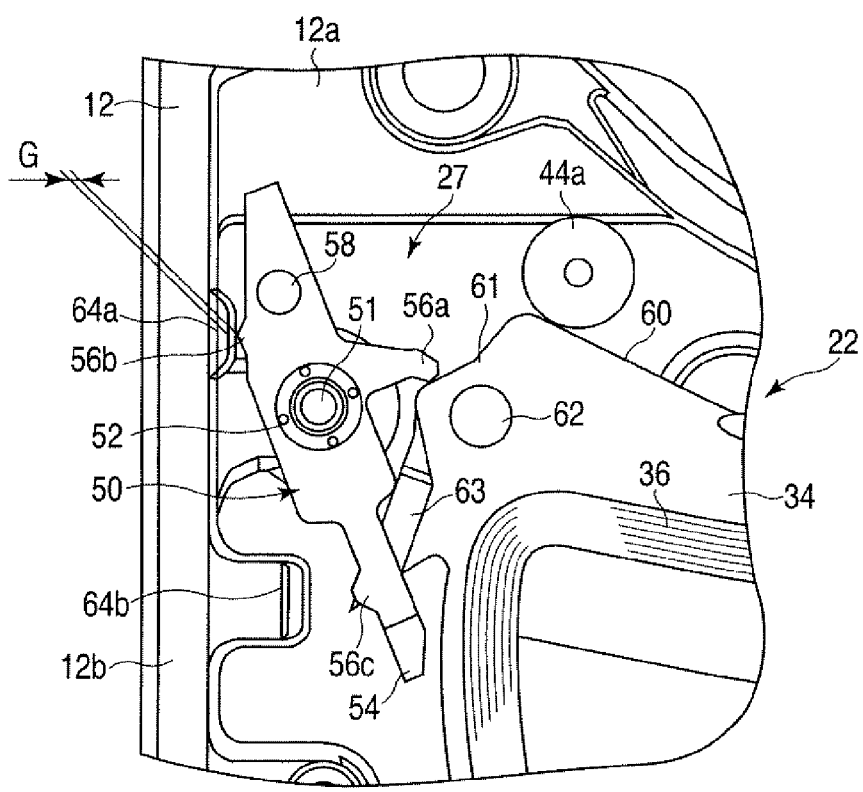
FIG. 3 is an exemplary enlarged plan view showing a latch mechanism of the HOD in a state that the latch member moves to a latch position.

FIG. 1 shows an internal structure of the HDD while a top cover thereof is removed, and FIG. 2 shows a carriage and a latch mechanism of the HDD. Further, FIG. 3 shows the latch mechanism in enlargement. As shown in FIGS. 1 and 2, the HDD has a case 10. The case 10 has a rectangular box-shaped base 12 with an opened top and the top cover, which is fixed to the base by a plurality of screws and closes the upper end opening of the base. The base 12 acting as a supporting bed has a rectangular bottom wall 12a and a side wall 12b standing around the peripheral edge of the bottom wall.

A spindle motor 18 as a drive motor mounted on the bottom wall 12a of the base 12 and two magnetic disks 16a, 16b supported and rotated by the spindle motor are disposed in the case 10. The HOD includes a plurality of magnetic heads 17 for recording and reproducing information to and from the magnetic disks 16a, 16b, a carriage 22 for movably supporting these magnetic heads with respect to the magnetic disks 16a, 16b, a voice coil motor (hereinafter, referred to as VCM) 24 for pivoting and positioning the carriage, a ramp load mechanism 25 for holding the magnetic heads at a retracted position away from the magnetic disks when the magnetic heads move to the outermost peripheries of the magnetic disks, an inertial latch mechanism 27 for holding the carriage at the retracted position when a shock and the like act on the HOD, and a board unit 21 including a preamplifier and the like, and these components are accommodated in the case 10. A print circuit board, not shown, is fixed to the outer surface of the bottom wall 12a of the base 12 by screws. The print circuit board controls the operations of the spindle motor 18, the VCM 24, and the magnetic heads 17 through the board unit 21. Further, a circulation filter 33 for removing dusts and dirts in the case 10 and a suction filter 37 for capturing dusts, dirts, and the like sucked into the case 10 from the outside are disposed in the base 12.

The respective magnetic disks 16a, 16b as recording mediums are formed in, for example, a diameter of 65 mm (2.5 inches) and have magnetic recording layers on the upper and lower surfaces thereof. The two magnetic disks 16a/16b are coaxially engaged with a hub, not-shown, of the spindle motor, clamped by a clamp spring 23, and fixed to the hub. With this arrangement, the magnetic disks 16a, 16b are supported at a position parallel to the bottom wall 12a of the base 12. Then, the magnetic disks 16a, 16b are rotated in the direction of an arrow A by the spindle motor 18 as a drive unit at a predetermined speed of, for example, 5400 rpm or 7200 rpm.

The carriage 22 has a bearing unit 26 fixed on the bottom wall 12a of the base 12 and four arms 28 extending from the bearing unit. The bearing unit 26 is located at a position away from the center of rotation of the magnetic disks in the longitudinal direction of the base 12 and in the vicinity of the outer peripheral edges of the magnetic disks. The four arms 28 are located parallel to the surfaces of the magnetic disks 16a, 16b at a predetermined interval therebetween and extend from the bearing unit 26 in the same direction. The carriage 22 has elastically deformable slender plate-shaped suspensions 30. The suspensions 30 are formed of a plate spring and have base ends fixed to the extreme ends of the arms 28 by spot welding or adhesion and extending from the arms. Note that the respective suspensions 30 may be formed integrally with the arms 28 corresponding thereto.

The magnetic heads 17 are mounted on the extending ends of the suspensions 30. The magnetic heads 17 have approximately rectangular sliders and recording/reproducing MR (magneto-resistive) heads formed on the sliders and are fixed to the distal end of the suspensions 30 through gimbals. Each two magnetic heads of the four magnetic heads 17, which are mounted on the suspensions 30, are located in confrontation with each other, respectively and disposed so as to clamp the respective magnetic disks from both the surfaces thereof.

The carriage 22 has a support frame 34 extending from the bearing unit 26 in the direction opposite to the arms 28, and a voice coil 36 constituting a part of the VCM 24 is supported by the support frame. The support frame 34 is formed of a synthetic resin to the outer periphery of the voice coil 36 integrally therewith. The voice coil 36 is located between a pair of yokes 38 fixed on the base 12 and constitutes the VCM 24 together with these yokes and a magnet 35 fixed to one of the yokes.

When power is supplied to the voice coil 36, the carriage 22 is rotated around the bearing unit 26 between the retracted position wherein the magnetic heads 17 are located on the sides of outer peripheries of the magnetic disks 16a, 16b away therefrom and an information processing position wherein the magnetic heads 17 are located on the magnetic disks. That is, the carriage 22 is rotated around the bearing unit 26 in the direction of an arrow B (load direction) and in the direction of an arrow C (unload direction), and the magnetic heads 17 are moved onto and positioned on desired tracks of the magnetic disks 16a, 16b. With this operation, the magnetic heads 17 can write or read out information to and from the magnetic disks 16a and 16b. The carriage 22 and the VCM 24 constitute a head actuator.

Pin-shaped first and second fixing stops 44a, 44b stand on the bottom wall 12a, respectively. The first fixing stop 44a is located at the position against which the support frame of the carriage abuts when the carriage 22 is rotated to the retracted position to thereby regulate that the carriage 22 excessively moves in the direction of the retracted position, that is, in the unload direction C. The second fixing stop 44b is located at the position against which the support frame 34 abuts when the carriage 22 is rotated to the innermost peripheral sides of the magnetic disks 16a, 16b to thereby regulate that the carriage 22 excessively moves in the direction of the information processing position, that is, in the load direction B. The first and second fixing stops 44a, 44b have elasticity to absorb a shock when the support frame 34 abuts thereagainst. The surfaces of the first and second fixing stops 44a, 44b are covered with, for example, an elastic member such as synthetic resin, rubber, and the like.

As shown in FIGS. 2 and 3, a stop abutment surface 60 acting as a stop abutment portion for abutting the first fixing stop 44a and a latch abutment portion 61 for abutting a latch arm of the latch mechanism 27 to be described later are formed on the support frame 34 of the carriage 22. A first magnetic attraction portion 62 formed of a magnetic material, for example, stainless steel and the like is formed in the vicinity of the latch abutment portion 61 of the support frame

34. The first magnetic attraction portion 62 is magnetically attracted to a magnet 35 of the VCM 24 and urges the carriage 22 in the direction of the retracted position, that is, in the direction in which the carriage 22 abuts against the first fixing stop 44a. Further, an engagement hook 63 extending externally is formed in the vicinity of the latch abutment portion 61 of the support frame 34 integrally therewith. The engagement hook 63 constitutes a part of the inertial latch mechanism 27.

The ramp load mechanism 25 has a ramp 40, which is provided on the bottom wall 12a of the base 12 and outside of the magnetic disks 16a, 16b, and tabs 42 extending from the distal ends of the respective suspensions 30. The ramp 40 is located downstream of the bearing unit 26 with respect to the rotating direction A of the magnetic disks 16a, 16b. When the carriage 22 is rotated and the magnetic heads 17 are moved to the retracted position outside of the magnetic disks 16a, 16b, the respective tabs 42 engage with ramp surfaces formed on the ramp 40 and thereafter are pulled upward along the inclination of the ramp surfaces to thereby unload the magnetic heads 17.

The board unit 21 has a main body 21a formed of the flexible print circuit board, and the main body 21a is fixed on the bottom wall 12a of the base 12. Electronic components such as a head amplifier and the like are mounted on the main body 21a. The board unit 21 has a main flexible print circuit board (hereinafter, referred to as main FPC) 21b extending from the main body 21a. The extending end of the main FPC 21b is connected to the carriage 22 in the vicinity of the bearing unit 26 and further electrically connected to the magnetic heads 17 through cables, not-shown, arranged on the arms 28 and the suspensions 30. A connector, not-shown, is mounted on the bottom surface of the main body of the board unit 21 and connected to the print circuit board.

As shown in FIGS. 2 and 3, the latch mechanism 27 has a latch arm 50, which is provided on the bottom wall 12a of the base 12 in the vicinity of the support frame 34 of the carriage 22, and an engagement hook 63 projecting from the support frame 34 of the carriage 22. The latch arm 50 acting as a latch member has a support portion 52 in a central portion thereof, and the support portion is pivotably supported on the bottom wall 12a by a pivot 51. The latch arm 50 has a latch hook 54, which extends from the support portion 52 and can be engaged with the engagement hook 63 of the support frame 34, a first abutment portion 56a, which extends from the support portion in a direction approximately perpendicular to the latch hook 54 and can abut the latch abutment portion 61 of the support frame 34, a second abutment portion 16b, which can abut a first latch stop 64a formed to the base 12, and a the third abutment portion 56c, which can abut the second latch stop 64b formed to the base 12, and these components are formed of synthetic resin and the like integrally with each other.

The latch arm 50 is supported such that the latch hook 54 can be moved between an illustrated latch position, at which the latch hook 54 is located in a moving path of the engagement hook 63 of the support frame 34 and can latch the carriage 22 and a release position at which the latched carriage 22 is released and allowed to pivot.

The second abutment portion 56b of the latch arm 50 is disposed on the side opposite to the latch hook 54 with respect to the support portion 52, and the third abutment portion 56c is disposed on the side of the latch hook 54 with respect to the support portion 52. The first latch stop 64a regulates the latch arm 50 from excessively moving in the direction of the latch position, and the second latch stop 64b regulates the latch arm 50 from excessively pivoting in the direction of the release position. The second abutment portion 56b of the latch arm 50 confronts with the first latch stop 64a at the latch position with a gap G. The gap G is set to, for example, 0.5 to 2 mm and preferably to 1 to 2 mm. Further, at the release position, the third abutment portion 56c of the latch arm 50 abuts the second latch stop 64b and regulates the latch arm 50 to pivot.

The latch arm 50 has a second magnetic attraction portion 58 disposed on the side opposite to the latch hook 54 across the support portion 52. The second magnetic attraction portion 58 is composed of a magnetic material such as stainless steel and the like embedded in the latch arm 50. The second magnetic attraction portion 58 is magnetically attracted to the magnet 35 of the VCM 24 and urges the latch arm 50 in the direction of the release position, that is, the direction where the first abutment portion 56a abuts the support frame of the carriage 22.

Figure 4:
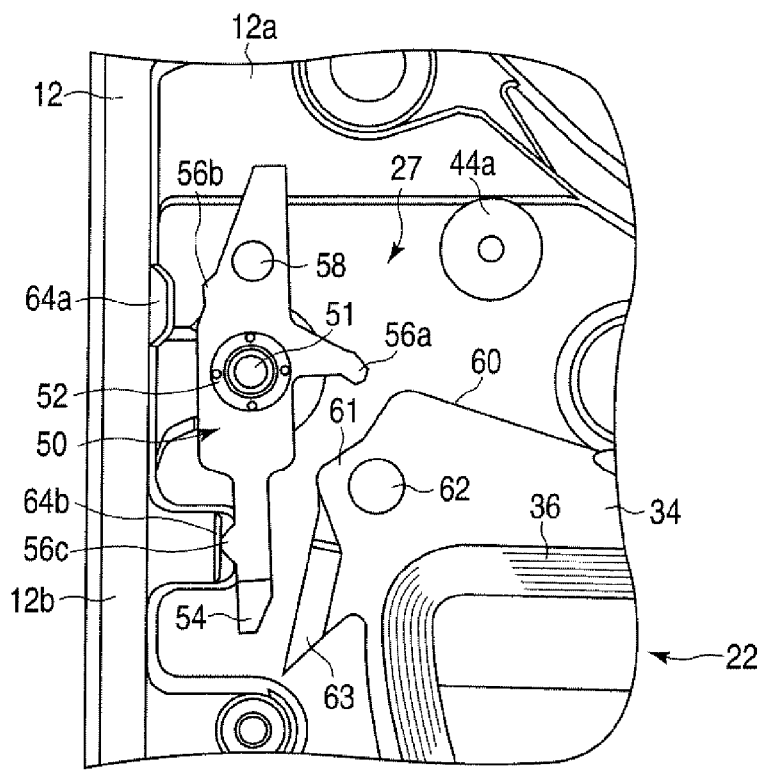
FIG. 4 is an exemplary enlarged plan view showing the latch mechanism of the HOD in a state that the latch member moves to a release position.

When the HDD receives an external force such as a shock and the like, the latch mechanism 27 arranged as described above latches the carriage 22 moved to the retracted position to thereby prevent the carriage from moving from the retracted position to the information processing position. That is, as shown in FIG. 4, when the HDD performs an information processing operation, the carriage 22 is rotated to the information processing position by the VCM 24, and the magnetic heads 17 are loaded on the magnetic disks 16a, 16b. When the carriage 22 is rotated to the information processing position, the latch abutment portion 61 of the support frame 34 is separated from the first abutment portion 56a of the latch arm 50. With this operation, the movement of the latch arm 50 is not restricted by the latch abutment portion 61, and the magnetic attraction portion 58 is magnetically attracted to the magnet 35 of the VCM 24. As a result, the latch arm 50 is pivoted about the pivot 51 clockwise and held at an illustrated release position at which the third abutment portion 56c abuts the second latch stop 64b. At the release position, the latch hook 54 of the latch arm 50 is separated from the engagement hook 63 formed to the support frame 34 and located away from the moving path of the engagement hook 63 to thereby allow the carriage 22 to pivot. With this operation, the engagement hook 63 is not engaged with the latch hook 54 so that the magnetic heads 17 can be loaded on the magnetic disks 16a, 16b.

When the carriage 22 is rotated from the information processing position to the retracted position at the time the operation of the HDD is stopped, the stop abutment surface 60 of the support frame 34 abuts the first fixing stop 44a as shown in FIG. 3. Further, since the first magnetic attraction portion 62 of the support frame 34 is magnetically attracted to the magnet 35, the carriage 22 is held at an illustrated retracted position at which the stop abutment surface 60 abuts the first fixing stop 44a. Note that since the first fixing stop 44a has elasticity, when the support frame 34 abuts the first fixing stop 44a, a shock is absorbed by the first fixing stop and collision noise can be suppressed.

When the carriage 22 is rotated to the retracted position, the latch abutment portion 61 of the support frame 34 abuts the first abutment portion 56a of the latch arm 50 and presses it. With this operation, the latch arm 50 is pivoted about the pivot 51 counterclockwise and moved to the illustrated latch position. At the time, since the latch arm 50 is urged clockwise about the pivot 51 by the magnetic attraction force of the second magnetic attraction portion 62, the first abutment portion 56a is pivoted in state that it is pressed against the latch abutment portion 61 of the support frame 34 and held at the latch position. Further, at the release position, the second abutment portion 56b of the latch arm 50 confronts with the first latch stop 64a at the gap G. Accordingly, the latch arm 50 is positioned only by the contact with the carriage 22 at the latch position and is not in contact with the first and second latch stops 64a, 64b of the base 12.

In the state that the latch arm 50 is held at the latch position, the latch hook 54 is located in the moving path of the engagement hook 63 in the vicinity of the engagement hook 63 of the support frame 34 so that it can latch the engagement hook 63.

Figure 5:
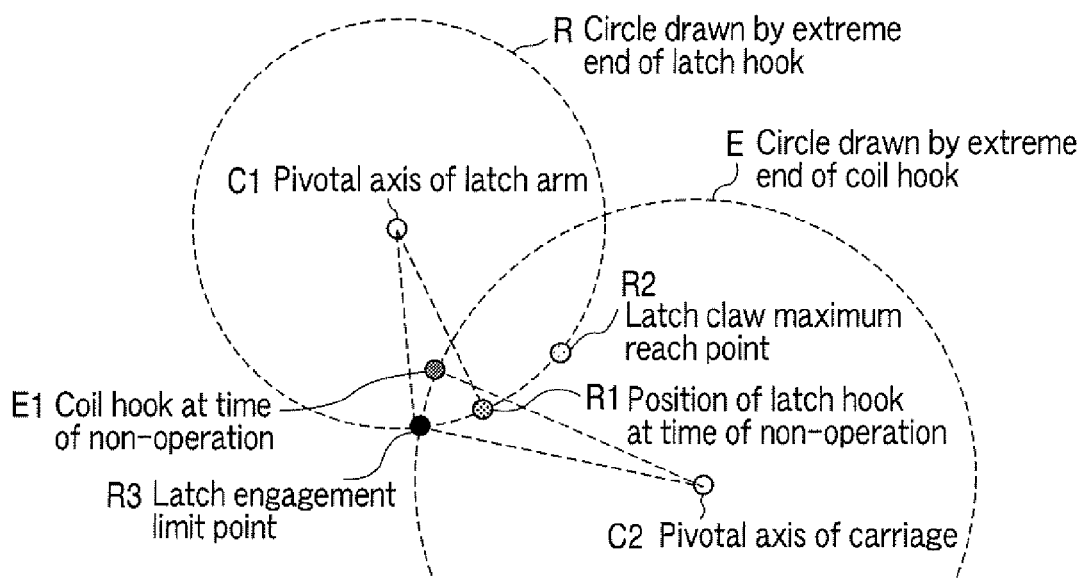
FIG. 5 is an exemplary view showing a positional relation between a path of a latch hook and a path of an engagement hook on a carriage side.

FIG. 5 shows the positional relation between a locus R of the latch hook 54 and a locus E of the engagement hook 63. The extreme end position of the latch hook 54 is shown by RI and the extreme end position of the engagement hook 63 is shown by E1 in the state that the latch arm 50 and the carriage 22 are at a rest, that is, at the latch position and the retracted position at the time of non-operation shown in FIG. 3. The extreme end of the latch hook 54 draws the locus R along a circle about the pivotal axis C1 of the latch arm 50, and the engagement hook 63 draws the locus E along a circle about the pivotal axis C2 of the carriage 22.

The extreme end R1 of the latch hook 54 at the time of non-operation exists in the inner periphery of the locus E drawn by the extreme end of the engagement hook 63. When the first abutment portion 56a of the latch arm 50 is separated from the latch abutment portion 61 of the carriage 22, the latch hook 54 begins to rotate clockwise by the magnetic attraction force caused by the second magnetic attraction portion 58. However, since the latch hook 54 exists within the inner periphery drawn by the engagement hook 63 until it reaches a latch engagement limit point R3, it can latch the engagement hook 63. That is, this means that even if the first abutment portion 56a is separated from the latch abutment portion 61 by an external shock at the time of non-operation, since the extreme end of the engagement hook 63 reaches the latch engagement limit point R3 before the extreme end of the latch hook 54 reaches the latch engagement limit point R3, the latch hook 54 is engaged with the engagement hook 63.

Figure 6:
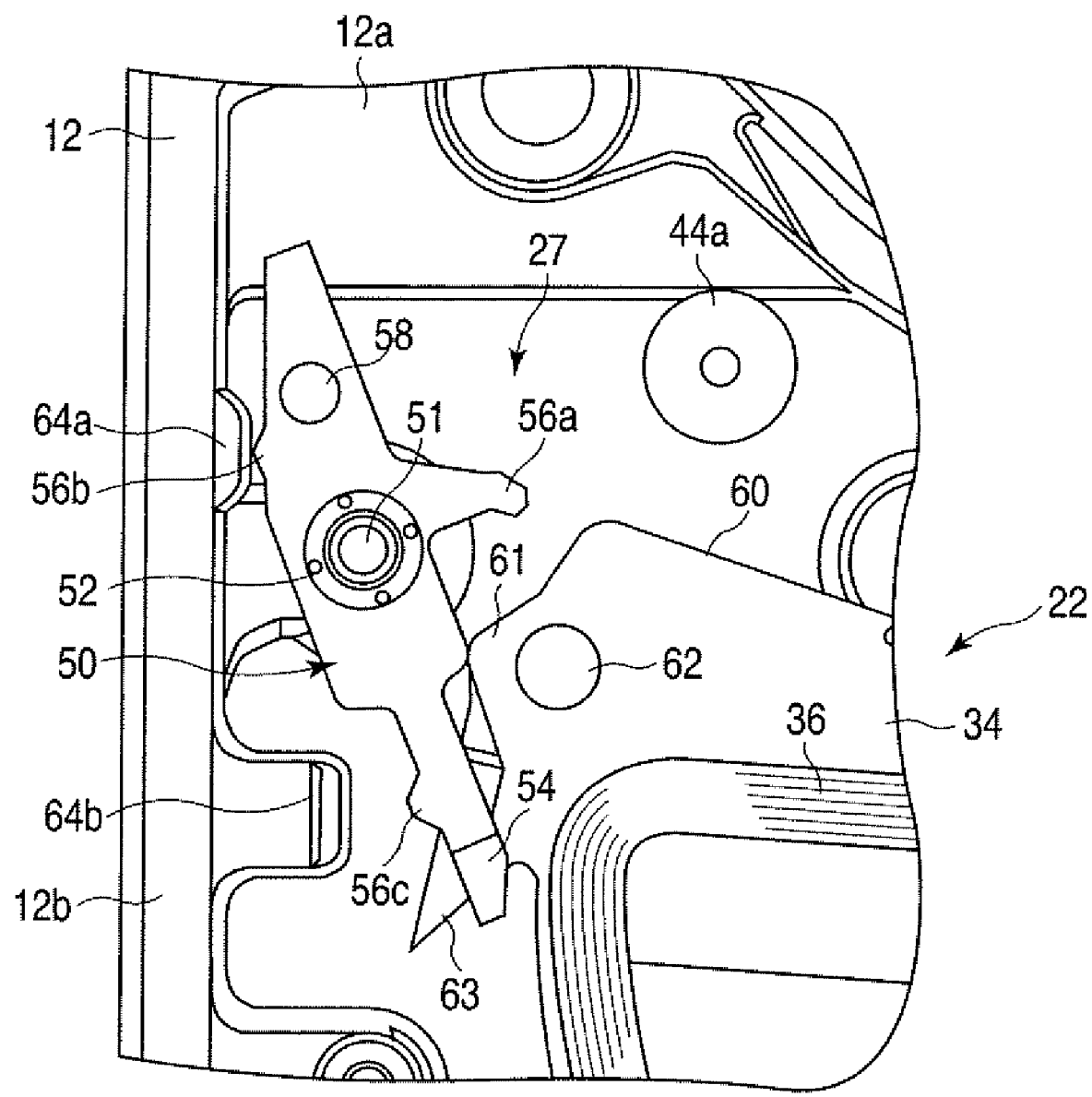
FIG. 6 is an exemplary plan view showing a state that the carriage is rotated by a rotational shock and a latch of the latch mechanism is engaged.

An operation when a strong rotational shock acts from the outside in the load direction B at the time the HDD is out of operation will be explained. When the rotational shock acts on the HDD in the load direction B in the state that the carriage 22 is moved to the retracted position and the latch arm 50 is held at the latch position at the time the HDD is out of operation, the carriage 22 is rotated by an inertial force counterclockwise around the bearing unit, that is, in the direction of the information processing position as shown in FIG. 6. In contrast, the counterclockwise inertial force also acts on the latch arm 50. At the time, although a magnetic force generated by the second magnetic attraction portion acts on the latch arm 50 clockwise, since it is resisted by the inertial force, the latch arm 50 moves slowly. Thus, the engagement hook 63 of the carriage 22 being rotated is engaged with the latch hook 53 of the latch arm 50 and is regulated to rotate. With this operation, the magnetic heads 17 can be prevented from projecting externally.

Further, when a strong rotational shock acts in the unload direction C from the outside at the time the HDD is out of operation, the carriage 22 tends to be rotated by inertial force clockwise around the bearing unit, that is, in the direction of the first fixing stop 44a. Since the inertial moment of the carriage 22 is much larger than that of the latch arm 50, the carriage 22 begins to rotate clockwise while being in contact with the first abutment portion 56a of the latch arm 50. Then, the carriage 22 is repulsed by the elastic force of the first fixing stop 44a and tends to largely pivot clockwise.

In contrast, the motion of the latch arm 50, which is rotated counterclockwise by the carriage 22, is gradually reduced by a clockwise rotational force generated by the magnetic attraction force of the second magnetic attraction portion 58 which acts at all times. At the same time, since the second abutment portion 56b of the latch arm 50 confronts with the first latch stop 64a at the gap G, the latch arm 50 is allowed to pivot counterclockwise by the amount of the gap G and thus neither instantly abuts the first latch stop 64a nor is repulsed.

At this time, since the latch arm 50 is pivoted counterclockwise by the carriage 22, the extreme end position of the latch hook 54 reaches a latch hook maximum reach point R2 of FIG. 5 and exists at a counterclockwise position apart from the latch hook extreme end position R1 at the time of non-operation. Accordingly, since the distance until the latch hook 54 reaches the latch engagement limit point R3 is more increased than the time of non-operation, even when the second abutment portion 56b abuts by the first latch stop 64a and repulsed, the latch hook 54 can be securely engaged with the engagement hook 63. With this operation, the rotation of the carriage 22 is regulated by the latch hook 54, and the carriage 22 is held at the retracted position.

According to the HDD as described above, provision of the latch mechanism regulates the unintentional movement of the carriage 22 even if an external force acts thereon in any direction, thereby a disadvantage that the magnetic heads are collided against the magnetic disks 16a, 16b and damaged can be prevented. Further, since the second abutment portion 56b of the latch arm is not in contact with the first latch stop 64a of the base 12 at the latch position at the time of non-operation, the elastic deformation of the latch arm caused by the rotational shock in the unload direction can be prevented by locking the latch arm also by the first fixing stop, thereby the reliability of the latch mechanism can be enhanced. Further, when the latch arm moves from the release position to the latch position, since it does not abut the stop of the baser collision noise can be prevented when the carriage is unloaded.

For example, the extreme end R1 of the latch hook 54 may exist on the outer periphery of the locus E drawn by the extreme end of the engagement hook 63 without existing in the inner periphery of the locus E drawn thereby. This can be applied in consideration of the balance between the magnetic attraction force of the latch arm and the inertial force.

While certain embodiments of the inventions have been described, these embodiments have been presented by way of example only, and are not intended to limit the scope of the invention. Indeed, the novel methods and systems described herein may be embodied in a variety of forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

For example, the shape of the latch member is not limited to the arm shape described above and may be variously changed. The number of the magnetic disks is not limited to two and may be increased and decreased as necessary. Further, the magnetic disk may be applied to any size of 3.5 inches, 2.5 inches, 1.8 inches, and the like.

What is claimed is:

1. A disk drive apparatus comprising:
   a base;
   a disk-shaped recording medium arranged on the base;
   a drive motor provided on the base which supports and rotates the recording medium;
   a head configured to perform information processing to the recording medium;
   a carriage which is provided on the base and supports the head to be movable with respect to the recording medium, the carriage being movable between a predetermined retracted position wherein the head is located on an outer periphery side of the recording medium and an information processing position wherein the head is located on the recording medium;

a fixing stop which is provided on the base and abuts the carriage when the carriage moves to the retracted position and positions the carriage at the retracted position; and a latch mechanism configured to latch the carriage and hold it at the retracted position when the carriage receives an external force in state that the carriage moves to the retracted position, the latch mechanism including a latch member, which is supported on the base to be movable between a latch position wherein the latch member is capable of latching the carriage and a release position wherein the latch member releases the latch, and a latch stop provided on the base and configured to regulate the movement of the latch member in a direction of the latch position, the latch member having a first abutment portion which abuts the carriage and moves the latch member from the release position to the latch position according to the movement of the carriage, when the carriage moves from the information processing position to the retracted position, a latch hook capable of latching the carriage at the latch position, and a second abutment portion which confronts to the latch hook with a gap at the latch position.

2. The disk drive apparatus according to claim 1, wherein the carriage includes a first magnetic attraction portion which urges the carriage to the direction of the retracted position, and the latch mechanism includes a second magnetic attraction portion which is provided at the latch member and urges the latch member in the direction of the release position.

3. The disk drive apparatus according to claim 2, wherein the latch member has a support portion rotatably supported on the base, and the second abutment portion and the second magnetic attraction portion are located on a side opposite to the latch hook with respect to the support portion.

4. The disk drive apparatus according to claim 3, wherein the latch mechanism includes a second latch stop which is arranged on the base and regulates the movement of the latch member in the direction of the latch release position, and the latch member includes a third abutment portion which is provided on the same side as the latch hook with respect to the support portion and configured to abut the second latch stop when the latch member is pivoted to the release position.

5. The disk drive apparatus according to claim 4 which further comprises coil motor configured to rotate the carriage, the coil motor having a magnet arranged on the base and a coil provided on the carriage to face the magnet, wherein the carriage includes a bearing unit rotatably supported on the base, a suspension extending from the bearing unit and supporting the head, and a support frame extending from the bearing unit in a direction opposite to the suspension and supporting the coil, and the first and second magnetic attraction portions are disposed at the positions where they are magnetically attracted by the magnet.

6. The disk drive apparatus according to claim 5, wherein the latch mechanism includes an engagement hook which is provided on the support frame and configured to engage with the latch hook of the latch member moved to the latch position, and the support frame includes a stop abutment portion configured to abut the fixing stop and a latch abutment portion configured to abut the first abutment portion of the latch member.

7. The disk drive apparatus according to claim 1, wherein the fixing stop has elasticity.

* * * * *